United States Patent [19]

Hand, Jr.

[11] 4,043,467

[45] Aug. 23, 1977

[54] ROTARY CAR DUMPER WITH SHIFTABLE FRAME

[75] Inventor: Arthur S. Hand, Jr., North Wales, Pa.

[73] Assignee: FMC Corporation, San Jose, Calif.

[21] Appl. No.: 730,413

[22] Filed: Oct. 7, 1976

[51] Int. Cl.² .......................................... B65G 67/34
[52] U.S. Cl. ................................................ 214/52 C
[58] Field of Search ................... 214/52 R, 52 C, 55, 214/56

[56] References Cited

U.S. PATENT DOCUMENTS

| | | | |
|---|---|---|---|
| 1,570,943 | 1/1926 | Case | 214/52 C |
| 1,599,053 | 9/1926 | Knight et al. | 214/52 C |

Primary Examiner—Albert J. Makay
Attorney, Agent, or Firm—J. F. Verhoeven; C. E. Tripp

[57] ABSTRACT

A railroad car dumper, suitable for dumping cars of a unit train, is disclosed. The dumper has a frame and a carriage, with tracks on the carriage to receive a car from adjacent tracks. The frame has a sidewall to support a car on the tracks during dumping with the car couplers on the axis of rotation of the dumper. The dumper frame is shiftable laterally, while the carriage remains fixed to maintain alignment of the carriage tracks with the adjacent tracks. Lateral shifting of the dumper frame while the carriage and tracks remain fixed permits a locomotive, larger than the cars to be dumped, to pass through the shifted frame.

6 Claims, 8 Drawing Figures

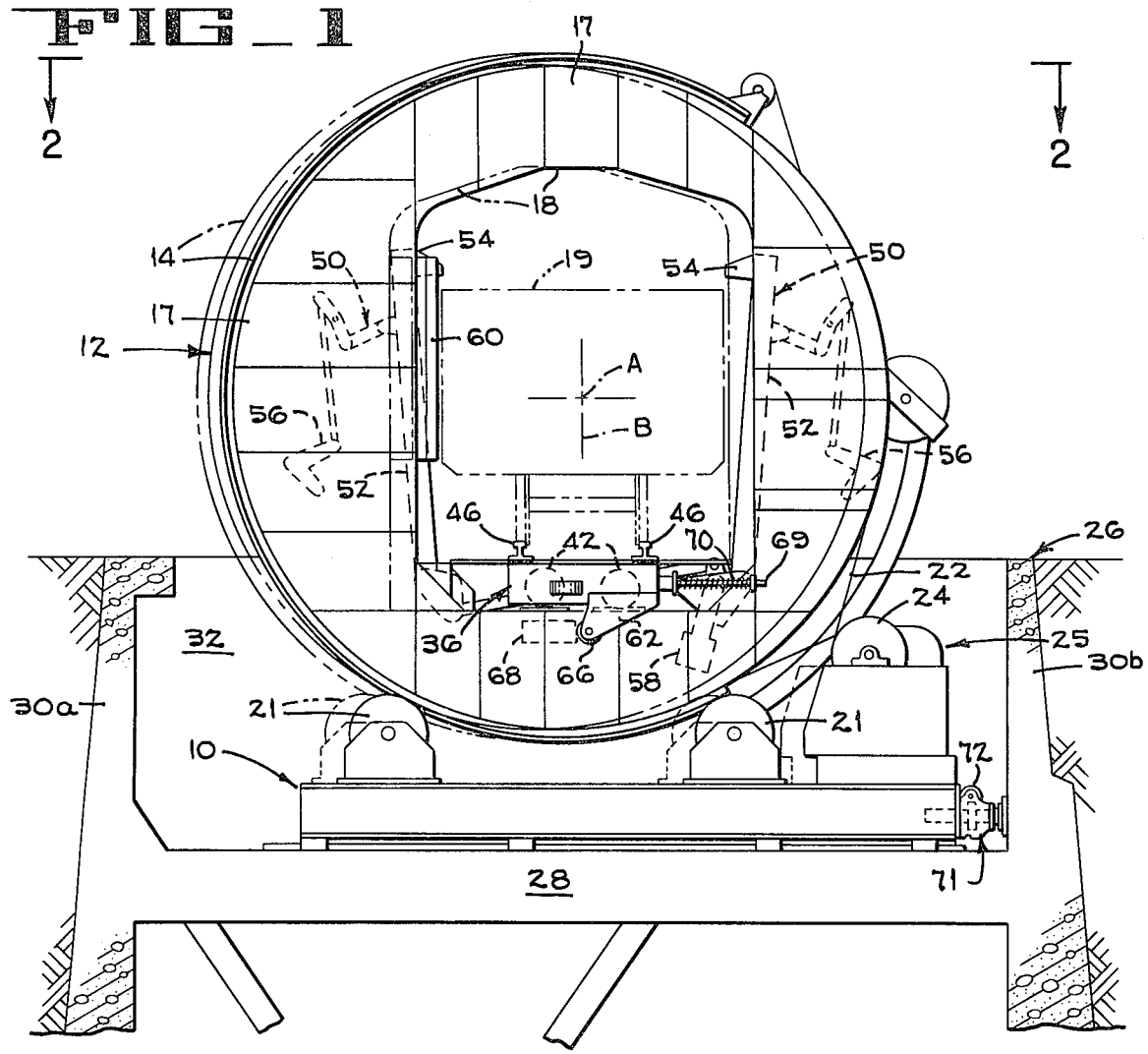
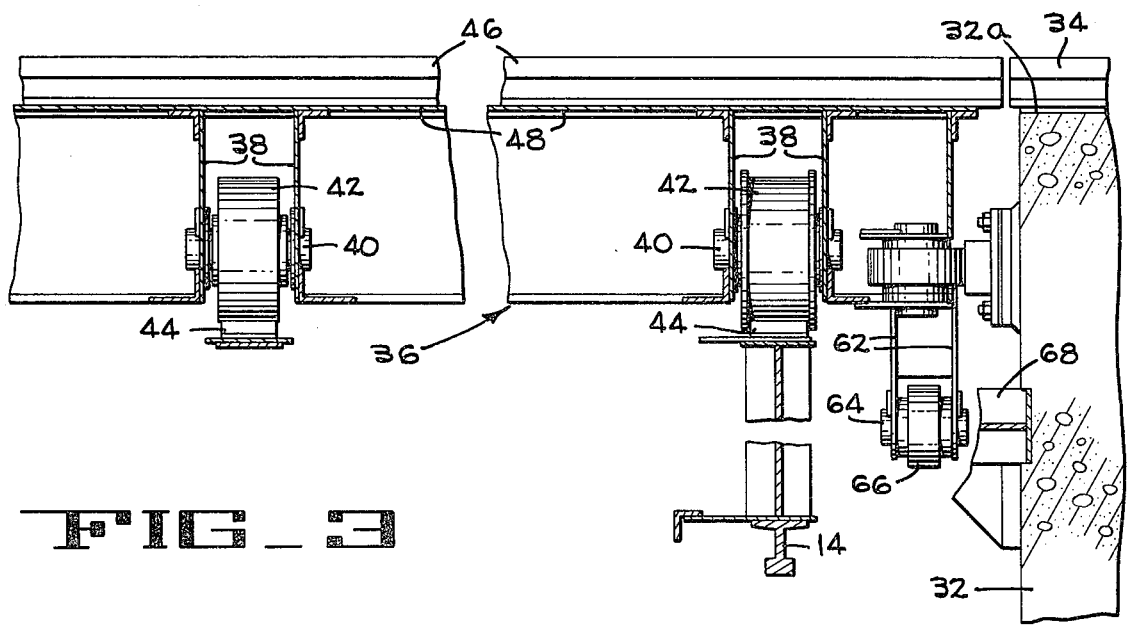

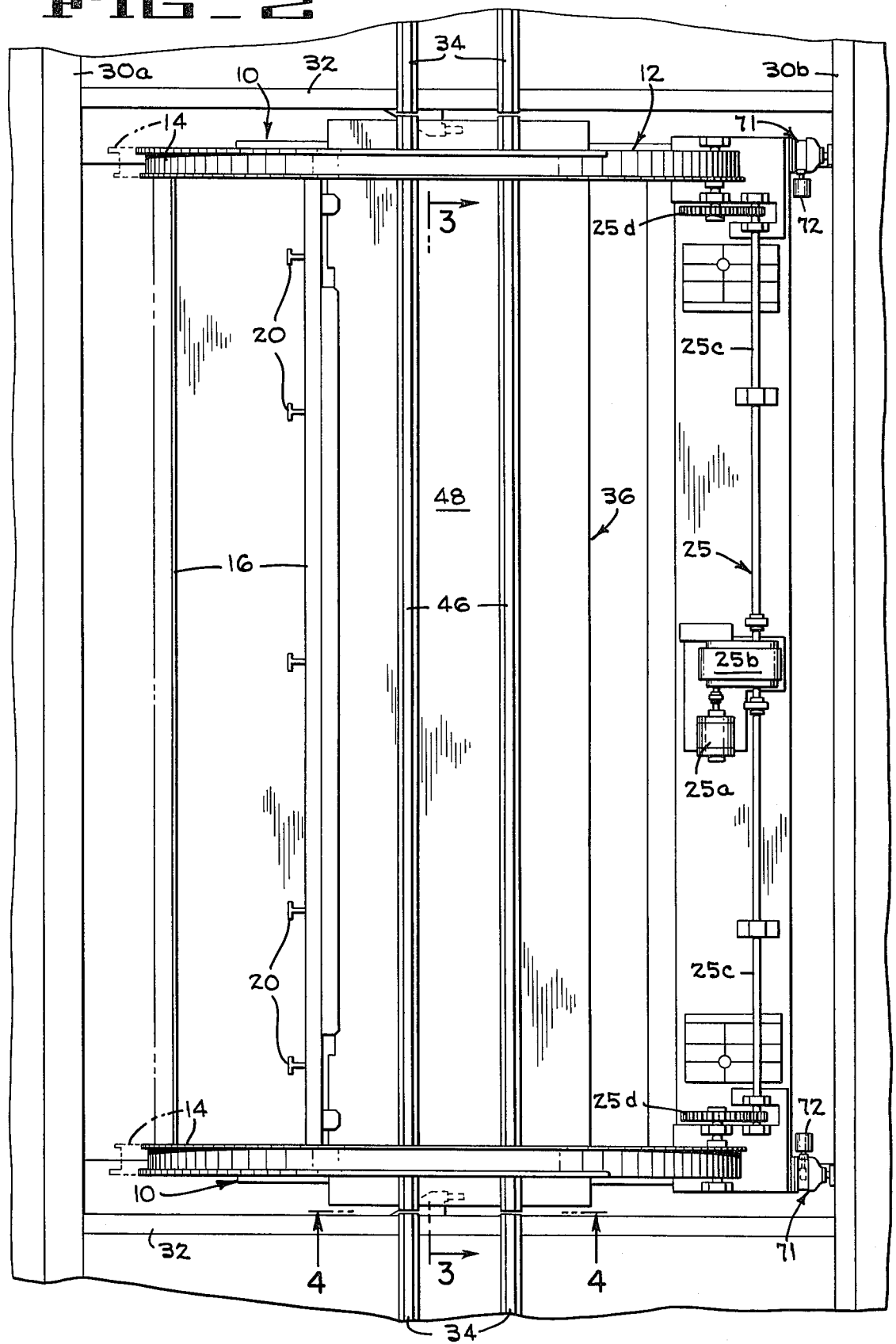

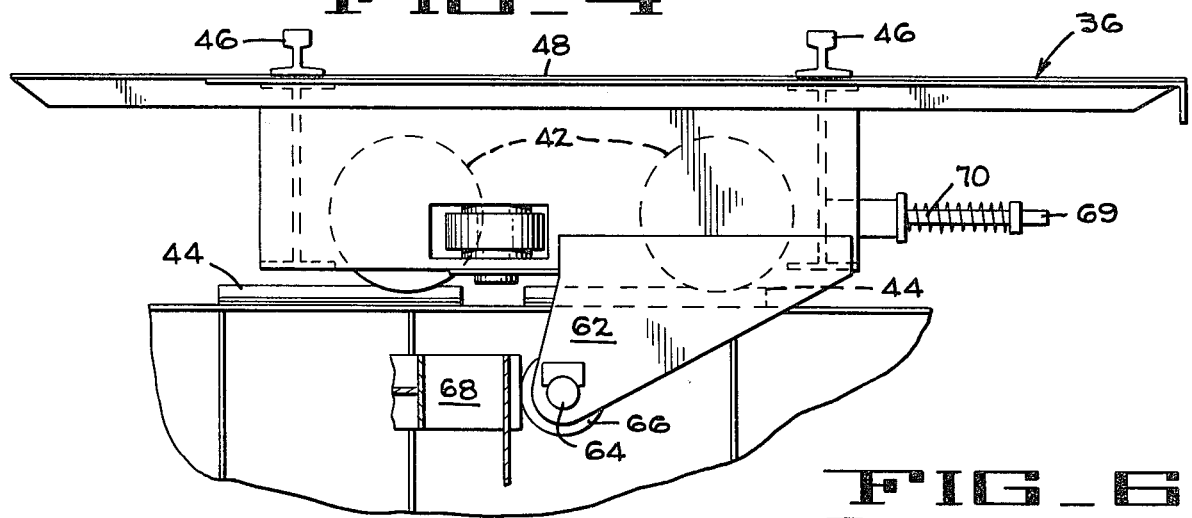
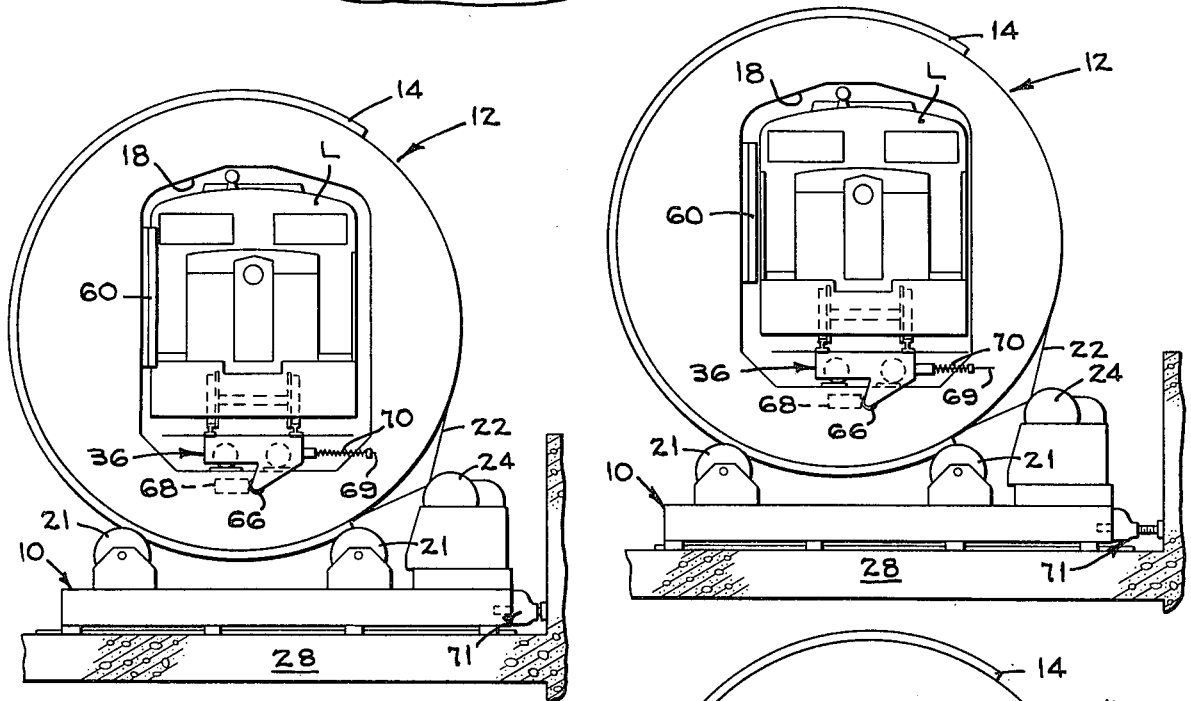
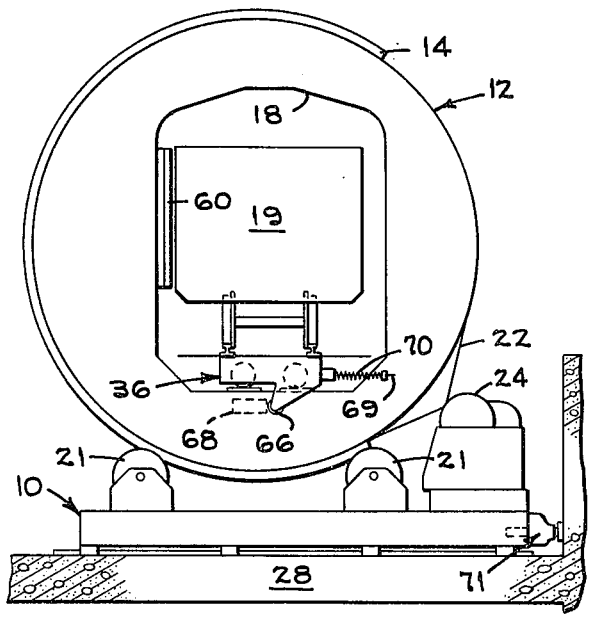

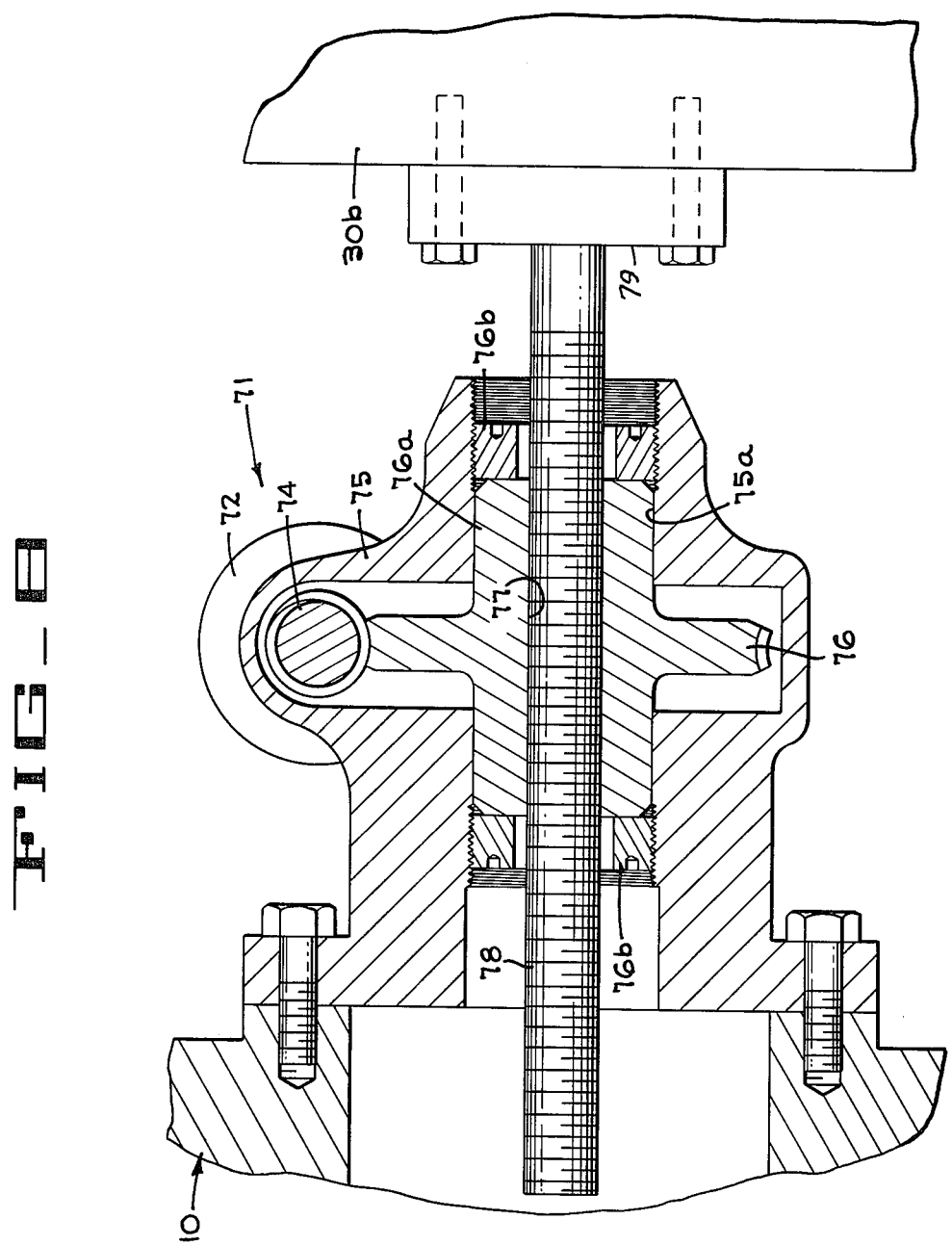
FIG_8

ROTARY CAR DUMPER WITH SHIFTABLE FRAME

BACKGROUND OF THE INVENTION

1. Field of the Invention

The present invention relates to car dumpers, and, more particularly, to a car dumper suitable to pass the engine of a unit train, or any engine or oversize car.

2. Description of the Prior Art

Generally, a railroad car dumper has a frame which is rotatable about a longitudinal axis. The dumper has tracks to receive a car to be dumped from adjacent tracks. It has long been known to mount the tracks in the dumper on a carriage which is shiftable laterally to move the car against a supporting sidewall in the dumper as the dumper rotates. With this type of dumper (shown, for example, in U.S. Pat. Nos. 1,770,175 and 3,373,829), the car or cars being dumped were separated from the remaining cars of the train before dumping.

With the advent of unit trains (that is, trains made up of a single type of car carrying a single product) and rotary couplers (that is, couplers which permit a car to be rotated about the longitudinal axis of the couplers while connected to a car which is not being rotated), it became desirable to pass the entire train in steps through the dumper, dumping one or more cars at a time without detaching the dumped cars from the adjacent cars outside the dumper. A dumper for this type of operation is shown in U.S. Pat. No. 3,275,169.

With the unit train, it is convenient to have the engine pass through the dumper first, and pull the cars of the train behind. It should be noted that whenever a car with rotary couplers is to be dumped (whether or not the car is a part of a unit train) without uncoupling from adjacent cars which are not to be dumped, the car couplers must remain substantially on the axis of rotation of the dumper. Since the sidewall in the dumper frame supports the car during dumping, and the car must enter the dumper on the axis of rotation of the dumper and remain on said axis, a problem of clearance of the sidewall will arise if the car is oversize, or if the engine must pass through the dumper. It should be noted that the problem of clearance of the sidewall can arise even if the train is not a unit train and even if the cars are not to remain coupled during dumping. In other words, even when the carriage supporting the tracks in the dumper is shiftable toward and away from the sidewall, a problem of clearance of an engine can arise.

In the U.S. Pat. No. 3,275,169, the problem of clearance is solved by providing a supporting sidewall which is movable in the frame up to the side of the car and away from the side of the car to provide alternatively support for the car, and clearance for passage of an engine or a wider car. Other patents showing movable car supports in the frame include U.S. Pat. No. 603,336; U.S. Pat. No. 758,191; U.S. Pat. No. 1,286,504; U.S. Pat. No. 1,440,888; U.S. Pat. No. 1,501,879; U.S. Pat. No. 1,846,970; U.S. Pat. No. 2,054,199; U.S. Pat. No. 2,542,660; U.S. Pat. No. 3,082,888; German Pat. No. 971,736; German Pat. No. 1,069,073; and German Pat. No. 1,143,146.

SUMMARY OF THE INVENTION

In the present invention, the troublesome problem of clearance for the engine is solved in a manner suitable for any type of train where the engine, or any oversize car, must pass through the dumper. In brief, the dumper frame and the opening therein is shiftable laterally with respect to the adjacent tracks. The tracks in the frame are mounted on a carriage, which are aligned with adjacent tracks when the dumper frame is upright. In order to gain clearance for a locomotive, the dumper frame is shifted laterally while the carriage is maintained in its original, aligned position so that the sidewall in the frame which supports the car during dumping is shifted out of the path of the locomotive. At the same time, the tracks on the carriage remain aligned with the adjacent tracks to permit the locomotive to pass through the frame.

It is therefore one object of the present invention to provide a car dumper through which locomotives can readily pass.

It is another object of the present invention to provide a car dumper with a shiftable frame to permit locomotives and/or oversize cars to pass.

It is yet another object of the present invention to provide a car dumper suitable for receiving and dumping the cars of a unit train.

BRIEF DESCRIPTION OF THE DRAWINGS

FIG. 1 is an end view of the car dumper of the present invention.

FIG. 2 is a plan view of the mechanism of FIG. 1.

FIG. 3 is a view taken on the line 3—3 of FIG. 2.

FIG. 4 is a view taken on the line 4—4 of FIG. 2.

FIG. 5 is a view of a locomotive approaching the dumper on an interference path with the sidewall when the dumper is in a normal position.

FIG. 6 shown the dumper frame shifted laterally to the left from its normal position to clear the engine.

FIG. 7 shows the dumper returned to its normal position with a car therein ready for dumping.

FIG. 8 is a view in cross-section showing the power units for shifting the dumper frame laterally.

DESCRIPTION OF THE PREFERRED EMBODIMENTS

There is shown herein in FIG. 1 a dumper having a base 10 and an invertible frame 12 mounted on the base. The frame 12 has two spaced apart circular rings 14 connected by longitudinal stringers 16. Vertical and horizontal strengthening members, as at 17, are secured within each ring in a pattern to define an opening 18 for the passage of a railroad car 19. Additional support members 20 are provided along the length of the dumper frame to rigidify the frame.

The base 10 has two rollers 21 for each of the end rings 14 to support the frame for rotation about a central longitudinal axis A of the frame. Rotation of the frame is accomplished by means of cables 22 which are trained over one of the end rings 14. The cable is wound around a power driven drum 24 to rotate the frame counter-clockwise (as viewed in FIG. 1) less than a complete revolution. The drum is rotated by a conventional power train indicated generally at 25 which is mounted on the base and includes an electric motor 25a, a speed reducer 25b, shafts 25c, and a gear train 25d.

The dumper is received in a sunken foundation 26 having a floor 28, two side walls 30a, 30b, and two end walls 32. The end walls are closely spaced to the ends of the frames, and, in a typical installation, the tops 32a of the end walls are at ground level. The railroad tracks 34 which carry cars to and from the dumper extend up to the end walls 32 of the foundation.

A carriage, indicated generally at 36, is mounted in the frame 12 for a limited lateral moement with respect to the frame. The carriage 36 extends the length of the frame and has near each end, a pair of downwardly extending transverse plates 38, as shown in FIG. 3, on each side of the carriage. At each end, two laterally spaced apart axles 40 extend between each pair of plates, each axle supporting a roller 42 between the plates. The rollers rest on horizontal, longitudinally spaced apart, transverse ways 44 which are secured in the frame. Thus, the carriage has four rollers, two at each end, all lying in transverse planes for lateral movement of the carriage on transverse ways in the frame.

Two rails 46 are secured on the upper surface 48 of the carriage. The rails 46 are spaced apart a distance equal to the spacing between tracks 34, and when the carriage 36 is in a car receiving position (as shown in FIG. 2), the rails 46 on the carriage are aligned with the tracks 34. A car or cars introduced into the car dumper is secured in place on the rails 46 by clamp members 50. Each clamp member is mounted on the frame and includes an arm 52 with a jaw 54 to engage the top of the car 19. It will be understood that any one of several conventional clamps can be used, and that the clamp shown, which is similar to that shown in the Suman et al. U.S Pat. No. 3,373,829, is shown by way of illustrative example only. The clamp arms are moved in against the side of the car as the frame begins to invert by engagement of bell crank 56 with a fixed cam (not shown), and the jaws are lowered onto the top of the car by the action of counterweight 58.

The carriage 36 has a pair of spaced parallel plates 62 extending downwardly therefrom, as shown in FIGS. 3 and 4. An axle 64 extends between the plates and carries a roller 66 thereon. The two end walls 32 of the foundation have extending therefrom a stop 68 with an abutment surface lying in the path of the roller 66. When the frame is in an upright position as shown in FIG. 1 and the roller 66 is engaged with stop 68, a vertical plane B midway between the tracks 46 on the carriage will pass through the axis A of rotation of the frame 12.

A rod 69 is mounted on carriage 36 and is slidably received in frame 12, as shown in FIG. 1. A spring 70, which is mounted on the rod between the carriage and the frame, urges the roller 66 into engagement with stop 68 when the frame is in the position shown in FIG. 1. As the frame begins to invert, the roller 66 on the carriage remains in engagement with the stop 68, by virtue of the force of compressed spring 70 until the side of the car engages the sidewall 60, at which time the roller 66 moves away from the stop 68 by virtue of the continuation of rotation of frame 12. The sidewall 60 is secured to the frame 12 at one side of opening 18.

In one mode of operation of a tupical car dumper, a unit train (that is, a train made up of an engine or engines and only cars of a single type, such as cars carrying coal) has cars with rotary couplings (that is, couplings on the axis A of rotation of the frame to permit individual cars to be inverted without inverting adjacent cars or uncoupling the inverted car from adjacent cars). A unit train is moved, in intermittent steps, through the car dumper, one or two or more cars at a time (depending on the length of the dumper), and each car or group of cars in the dumper is inverted with respect to the other cars, without detachment from the other cars, to dump its load. The train is then advanced an incremental amount and the next car, or group of cars, is dumped. The incremental movement of the cars through the dumper is continued until all the cars are unloaded. Rotary car couplers, and this mode of operation of a dumper, are known to those skilled in the art.

When the car dumper of the present invention is for use with a unit train, the sidewall 60 will be fixed to frame 12 so that it will be closely spaced to the side of a car when the frame is in the upright position of FIG. 1. Thus, the carriage is moved only minutely before the car 19 engages sidewall 60, and the rotary couplers between the cars will remain on the longitudinal axis A of frame rotation.

After the car is inverted to its dump position and the load therein dumped, the frame 12 is rotated clockwise to return the frame and car toward the position shown in FIG. 1. When the roller 66 engages the stop 68, the movement of the carriage is arrested while the rotation of the frame 12 continues until it reaches the position shown in FIG. 1. As the frame completes its return rotary movement, and after the roller 66 has engaged the stop 68, the sidewall 60 moves slightly away from the side of the car until the frame, carriage and car are in the position shown in FIGS. 1 and 7. It will be noted that the spring 70 urges the roller 66 against stop 68.

One serious problem, however, occurs when a dumper, although having an opening (such as opening 18) of adequate size to accommodate a car of the unit train, will not permit the locomotive of the unit train to pass. If the span across the opening is less than the corresponding span of the locomotive, there is no way that the locomotive can pass through the dumper, and a smaller locomotive, or some other means, will have to be provided to move the train in steps through the dumper. Alternatively, the locomotive will have to push the car, one or more at a time, into the dumper.

Sometimes, however, the span across the opening is as large or larger than the span across the engine, but one side or the other of the locomotive L would engage the sidewall 60 of the dumper, as shown in FIG. 5, if the train were to run through the dumper. A solution to this problem is provided by the present invention.

A dumper shifting mechanism, shown generally at 71, is provided between one side wall 30b of the foundation and one side of the base 10 of the dumper. This shifting mechanism, in the illustrative form shown herein, has a motor 72 (FIG. 8) with a worm 74 mounted on the shaft thereof. The worm 74 is received in a housing 75 and is engaged with a worm wheel 76 therein. The worm wheel 76 has hubs 76a in housing bore 75a, and nuts 76b threadedly received in bore 75a hold the worm wheel 76 in position. Worm wheel 76 has a central threaded bore 77 to receive screw jack 78 therein. The screw jack has a head 79 secured to wall 30 of the foundation, and the housing 75 is secured to the base 10 of the dumper. When the motor 72, which is reversible, is run in one direction or the other, the base of the dumper (and the frame thereon) is moved in one direction or the other relative to the wall 30.

When the motor 72 is run in one direction to extend the screw 78 from the housing 75 and move the base 10 and frame 12 to the left as shown in FIG. 6, the carriage 36 of the dumper remains fixed. As the frame 12 moves to the left and the carriage 36 remains fixed, the spring 70 (which is received between the carriage and the frame) compresses. This is because the roller 66 on the carriage is engaged with the stop 68, which is mounted on the foundation. Hence, the frame 12 (and the ways 44 thereon) shift to the left but the carriage, which has rollers 42 engaged with the ways, remains fixed.

Since the carriage remains fixed, the rails 46 thereof remain aligned with the tracks 34. At the same time, the frame 12 has been shifted to the left as shown in FIG. 6, so the locomotive L can proceed through the dumper, clearing the opening 18 thereof. Thereafter, and before the dumping of any of the cars begins, the motor 72 is reversed to shift the dumper frame 12 to the right, as shown in FIG. 7, but again, without shifting the carriage. As the frame moves to the right (toward the position shown in FIG. 7), the spring 70 expands, maintaining the roller 66 in contact with the stop 68. In this position, the sidewall 60 is again close to the side of a car to support the car with the couplers thereof on the longitudinal axis of rotation of the frame.

It should be noted that the car dumper of the present invention is suitable for use with any train having oversized cars or locomotives for which clearance must be provided. It is particularly suited, however, for unit trains where the sidewall must be closely spaced to the side of the car and where the couplers must remain on the axis of rotation of the frame.

Although the best mode contemplated for carrying out the present invention has been herein shown and described, it will be apparent that modification and variation may be made without departing from what is regarded to be the subject matter of the invention.

What is claimed is:

1. A car dumper to recive cars from and to discharge cars to an adjacent track, said dumper comprising in combination: a base, a frame mounted on the base and invertible thereon about a longitudinal axis, said frame having an opening to pass cars therethrough, a carriage mounted in the frame and shiftable laterally therein, said carriage having rails to receive cars from and to discharge cars to said adjacent tracks when the rails of the platform are aligned with the adjacent tracks, means to shift the base and the frame thereon laterally with respect to the adjacent tracks, and means to maintain the carriage stationary during said shift to maintain the rails on said carriage in alignment with the tracks.

2. A car dumper to receive the cars from and to discharge cars to an adjacent track, said dumper comprising in combination: a base, a frame mounted on the base and invertible thereon about a longitudinal axis, said frame having an opening to pass cars therethrough, a carriage mounted in the frame and invertible therewith, said carriage movable laterally in the frame and having rails aligned with said adjacent tracks when the frame is in an upright position, means to shift the base and the frame thereon laterally with respect to the adjacent tracks, and a stop member fixed with respect to the adjacent tracks, to engage the carriage to maintain the carriage stationary during said shift to maintain the rails on said carriage in alignment with the tracks.

3. A car dumper to receive cars from and to discharge cars to an adjacent track, said dumper comprising in combination: a foundation, a base movably mounted in the foundation, a frame mounted on the base and invertible thereon about a longitudinal axis, said frame having an opening to pass cars therethrough, a carriage mounted in the frame and invertible therewith, said carriage movable laterally in the frame and having rails to receive cars from and to discharge cars to said adjacent tracks when the rails of the carriage are aligned with the adjacent tracks, means to shift the base on the foundation and thereby shift the opening in the frame laterally with respect to the adjacent tracks, a stop member mounted in the foundation to engage the carriage and to maintain the carriage stationary during said shift to maintain the rails on said carriage in alignment with the tracks.

4. A car dumper to receive cars from and to discharge cars to an adjacent track, said dumper having a foundation, a base mounted on the foundation, a frame mounted on the base and invertible thereon about a longitudinal axis, said frame having an opening to pass cars therethrough, a carriage mounted in the frame and invertible therewith, said carriage shiftable laterally in the frame and having rails to receive cars from and to discharge cars to said adjacent tracks when the rails of the carriage are aligned with the adjacent tracks, the improvement comprising means to shift the base on the foundation and thereby shift the opening in the frame laterally with respect to the adjacent tracks, and means to maintain the carriage stationary during said shift to maintain the rails on said carriage in alignment with the tracks.

5. The mechanism of claim 4 wherein said means to maintain the carriage stationary during said shift includes a stop member in the foundation to engage the carriage.

6. The mechanism of claim 5 including a spring mounted between the carriage and the frame to urge the carriage into engagement with the stop member.

* * * * *

UNITED STATES PATENT OFFICE
CERTIFICATE OF CORRECTION

Patent No. 4,043,467  Dated August 23, 1977

Inventor(s) ARTHUR S. HAND, JR.

It is certified that error appears in the above-identified patent and that said Letters Patent are hereby corrected as shown below:

Col. 1, line 18, change "1,770,175" to --1,770,275--.
Col. 2, line 32, change "shown" to --shows--.
Col. 3, line 2, change "moement" to --movement--.
       line 54, change "tupical" to --typical--.
Col. 4, line 34, change "car" to --cars--.
Col. 5, line 28, change "recive" to --receive--.

Signed and Sealed this

Thirteenth Day of November 1979

[SEAL]

Attest:

RUTH C. MASON
Attesting Officer

LUTRELLE F. PARKER
Acting Commissioner of Patents and Trademarks